United States Patent
Sharifi et al.

(10) Patent No.: US 10,055,390 B2
(45) Date of Patent: Aug. 21, 2018

(54) SIMULATED HYPERLINKS ON A MOBILE DEVICE BASED ON USER INTENT AND A CENTERED SELECTION OF TEXT

(71) Applicant: GOOGLE INC., Mountain View, CA (US)

(72) Inventors: Matthew Sharifi, Kilchberg (CH); David Petrou, Brooklyn, NY (US)

(73) Assignee: GOOGLE LLC, Mountain View, CA (US)

( * ) Notice: Subject to any disclaimer, the term of this patent is extended or adjusted under 35 U.S.C. 154(b) by 124 days.

(21) Appl. No.: 14/945,348

(22) Filed: Nov. 18, 2015

(65) Prior Publication Data

US 2017/0139879 A1 May 18, 2017

(51) Int. Cl.
*G06F 17/22* (2006.01)
*G06F 3/0482* (2013.01)
(Continued)

(52) U.S. Cl.
CPC ........ *G06F 17/2235* (2013.01); *G06F 3/0482* (2013.01); *G06F 3/04842* (2013.01); *G06F 9/453* (2018.02); *G06F 9/4843* (2013.01)

(58) Field of Classification Search
CPC ........... G06F 17/30905; G06F 3/04842; G06F 3/0482
See application file for complete search history.

(56) References Cited

U.S. PATENT DOCUMENTS

| | | |
|---|---|---|
| 5,731,844 A | 3/1998 | Rauch et al. |
| 5,946,647 A | 8/1999 | Miller et al. |

(Continued)

FOREIGN PATENT DOCUMENTS

| | | |
|---|---|---|
| CN | 101075236 A | 11/2007 |
| CN | 101201827 A | 6/2008 |

(Continued)

OTHER PUBLICATIONS

Hsu, et al. "Snap2Read: Automatic Magazine Capturing and Analysis for Adaptive Mobile Reading", Lecture Notes in Computer Science, vol. 6524, 2011, 11 pages.

(Continued)

*Primary Examiner* — Cesar Paula
*Assistant Examiner* — Konrad Kulikowski
(74) *Attorney, Agent, or Firm* — Middleton Reutlinger

(57) ABSTRACT

Systems and methods simulate a hyperlink in regular content displayed on a screen. An example method can include generating, responsive to detecting a simulated hyperlink indication, a centered selection from content displayed on a display of a computing device, providing the centered selection to a simulated hyperlink model that predicts an operation given the centered selection, and initiating the operation using an intent associated with a mobile application. The simulated hyperlink model may also provide, from the centered selection, an intelligent selection used the intent's parameter. Another method includes identifying documents having a hyperlink whitelisted websites, generating positive training examples for a simulated hyperlink model using the documents, each positive training example having a centered selection, a website, and a mobile application mapped to the website, and training the simulated hyperlink model, using the positive training examples, to predict an operation for the mobile application given the centered selection.

15 Claims, 7 Drawing Sheets

(51) Int. Cl.
*G06F 3/0484* (2013.01)
*G06F 9/48* (2006.01)
*G06F 9/451* (2018.01)

(56) References Cited

U.S. PATENT DOCUMENTS

| | | |
|---|---|---|
| 6,662,226 B1 | 12/2003 | Wang et al. |
| 7,054,917 B1 | 5/2006 | Kirsch et al. |
| 7,421,153 B1 | 9/2008 | Ronca et al. |
| 7,548,915 B2 | 6/2009 | Ramer et al. |
| 7,822,759 B2 | 10/2010 | MacLaurin et al. |
| 7,917,514 B2 | 3/2011 | Lawler et al. |
| 8,090,222 B1 | 1/2012 | Baluja et al. |
| 8,131,786 B1 | 3/2012 | Bengio et al. |
| 8,150,911 B2 | 4/2012 | Bell et al. |
| 8,255,386 B1 | 8/2012 | Annau et al. |
| 8,341,156 B1 | 12/2012 | Westgate et al. |
| 8,347,237 B2 | 1/2013 | Bier et al. |
| 8,418,055 B2 | 4/2013 | King et al. |
| 8,452,799 B2 | 5/2013 | Zhou et al. |
| 8,468,110 B1 * | 6/2013 | Podgorny ........... G06F 11/3438 706/45 |
| 8,571,319 B2 | 10/2013 | Balasubramanian et al. |
| 8,645,325 B2 | 2/2014 | Anderson et al. |
| 8,671,341 B1 | 3/2014 | Hellwig et al. |
| 8,700,604 B2 | 4/2014 | Roseman et al. |
| 8,767,497 B2 | 7/2014 | Marumoto et al. |
| 8,799,061 B1 | 8/2014 | Chatterjee et al. |
| 8,954,836 B1 | 2/2015 | Look et al. |
| 8,977,639 B2 | 3/2015 | Petrou et al. |
| 9,165,406 B1 | 10/2015 | Gray et al. |
| 9,176,984 B2 | 11/2015 | Hull et al. |
| 9,276,883 B2 | 3/2016 | Zhang et al. |
| 9,354,778 B2 | 5/2016 | Cornaby et al. |
| 9,424,668 B1 | 8/2016 | Petrou et al. |
| 9,582,482 B1 | 2/2017 | Sharifi et al. |
| 9,703,541 B2 | 7/2017 | Sharifi et al. |
| 2004/0117750 A1 | 6/2004 | Skoll et al. |
| 2005/0083413 A1 | 4/2005 | Reed et al. |
| 2006/0047639 A1 | 3/2006 | King et al. |
| 2006/0080594 A1 | 4/2006 | Chavoustie et al. |
| 2006/0106844 A1 | 5/2006 | Naick et al. |
| 2006/0156222 A1 | 7/2006 | Chi et al. |
| 2006/0221409 A1 | 10/2006 | Cohen et al. |
| 2006/0253491 A1 | 11/2006 | Gokturk et al. |
| 2007/0008321 A1 | 1/2007 | Gallagher et al. |
| 2007/0047781 A1 | 3/2007 | Hull et al. |
| 2007/0143345 A1 | 6/2007 | Jones et al. |
| 2007/0168379 A1 | 7/2007 | Patel et al. |
| 2007/0233671 A1 | 10/2007 | Oztekin et al. |
| 2008/0176606 A1 | 7/2008 | Kim |
| 2008/0235018 A1 | 9/2008 | Eggen et al. |
| 2008/0275701 A1 | 11/2008 | Wu et al. |
| 2008/0281974 A1 | 11/2008 | Slothouber et al. |
| 2008/0301101 A1 | 12/2008 | Baratto et al. |
| 2009/0005003 A1 | 1/2009 | Hartwell |
| 2009/0006388 A1 | 1/2009 | Ives et al. |
| 2009/0036215 A1 | 2/2009 | Saeki |
| 2009/0063431 A1 | 3/2009 | Erol et al. |
| 2009/0138466 A1 | 5/2009 | Henry et al. |
| 2009/0228573 A1 | 9/2009 | Asakawa et al. |
| 2009/0228777 A1 | 9/2009 | Henry et al. |
| 2009/0252413 A1 | 10/2009 | Hua et al. |
| 2009/0282012 A1 | 11/2009 | Konig et al. |
| 2009/0319449 A1 | 12/2009 | Gamon et al. |
| 2010/0010987 A1 | 1/2010 | Smyth et al. |
| 2010/0060655 A1 | 3/2010 | Huang |
| 2010/0088612 A1 | 4/2010 | Jia et al. |
| 2010/0250598 A1 | 9/2010 | Brauer et al. |
| 2010/0262928 A1 | 10/2010 | Abbott |
| 2010/0306249 A1 | 12/2010 | Hill et al. |
| 2010/0313141 A1 | 12/2010 | Yu et al. |
| 2011/0072455 A1 | 3/2011 | Pickelsimer et al. |
| 2011/0125735 A1 | 5/2011 | Petrou |
| 2011/0128288 A1 | 6/2011 | Petrou et al. |
| 2011/0131160 A1 | 6/2011 | Canny et al. |
| 2011/0131235 A1 | 6/2011 | Petrou et al. |
| 2011/0145692 A1 | 6/2011 | Noyes et al. |
| 2011/0191676 A1 | 8/2011 | Guttman et al. |
| 2011/0225152 A1 | 9/2011 | Beaudreau et al. |
| 2011/0238768 A1 | 9/2011 | Habets et al. |
| 2011/0246471 A1 | 10/2011 | Rakib |
| 2011/0258049 A1 | 10/2011 | Ramer et al. |
| 2011/0275358 A1 | 11/2011 | Faenger |
| 2011/0283296 A1 | 11/2011 | Chun |
| 2011/0307478 A1 | 12/2011 | Pinckney et al. |
| 2011/0307483 A1 | 12/2011 | Radlinski et al. |
| 2012/0044137 A1 | 2/2012 | Oddiraju et al. |
| 2012/0083294 A1 | 4/2012 | Bray et al. |
| 2012/0092286 A1 | 4/2012 | O'Prey et al. |
| 2012/0117058 A1 | 5/2012 | Rubinstein et al. |
| 2012/0158751 A1 | 6/2012 | Tseng |
| 2012/0159340 A1 | 6/2012 | Bae et al. |
| 2012/0191840 A1 | 7/2012 | Gordon |
| 2012/0194519 A1 | 8/2012 | Bissell et al. |
| 2012/0216102 A1 | 8/2012 | Malla |
| 2013/0080447 A1 | 3/2013 | Ramer et al. |
| 2013/0091463 A1 * | 4/2013 | Nordstrom ........ G06F 17/30905 715/810 |
| 2013/0097507 A1 | 4/2013 | Prewett |
| 2013/0108161 A1 | 5/2013 | Carr |
| 2013/0111328 A1 | 5/2013 | Khanna et al. |
| 2013/0117252 A1 | 5/2013 | Samaddar et al. |
| 2013/0173604 A1 | 7/2013 | Li et al. |
| 2013/0254217 A1 | 9/2013 | Xu |
| 2013/0263098 A1 | 10/2013 | Duda et al. |
| 2013/0290110 A1 | 10/2013 | Luvogt et al. |
| 2013/0325844 A1 | 12/2013 | Plaisant |
| 2013/0346431 A1 | 12/2013 | Erol et al. |
| 2014/0029810 A1 | 1/2014 | Barr et al. |
| 2014/0040272 A1 | 2/2014 | Houghton |
| 2014/0046965 A1 | 2/2014 | Tian et al. |
| 2014/0082670 A1 | 3/2014 | Papish |
| 2014/0089626 A1 | 3/2014 | Schluessler et al. |
| 2014/0118597 A1 | 5/2014 | Tabak et al. |
| 2014/0142922 A1 | 5/2014 | Liang et al. |
| 2014/0146200 A1 | 5/2014 | Scott et al. |
| 2014/0157210 A1 | 6/2014 | Katz et al. |
| 2014/0188889 A1 | 7/2014 | Martens et al. |
| 2014/0208234 A1 | 7/2014 | Amit et al. |
| 2014/0250147 A1 | 9/2014 | Shapira et al. |
| 2014/0279013 A1 | 9/2014 | Chelly et al. |
| 2014/0282660 A1 | 9/2014 | Oztaskent et al. |
| 2014/0316890 A1 | 10/2014 | Kagan |
| 2014/0362108 A1 | 12/2014 | Aguera-Arcas |
| 2014/0366158 A1 | 12/2014 | Han et al. |
| 2015/0016700 A1 | 1/2015 | Drozdzal et al. |
| 2015/0019997 A1 | 1/2015 | Kim et al. |
| 2015/0095855 A1 | 4/2015 | Huo et al. |
| 2015/0100524 A1 * | 4/2015 | Pantel ................. G06F 17/3053 706/12 |
| 2015/0169701 A1 | 6/2015 | Stekkelpak et al. |
| 2015/0178786 A1 | 6/2015 | Claessens |
| 2015/0212695 A1 | 7/2015 | Nordstrom et al. |
| 2015/0339405 A1 | 11/2015 | Vora et al. |
| 2016/0055246 A1 | 2/2016 | Marcin et al. |
| 2016/0321052 A1 | 11/2016 | Sharifi et al. |
| 2017/0098159 A1 | 4/2017 | Sharifi et al. |
| 2017/0118576 A1 | 4/2017 | Sharifi et al. |

FOREIGN PATENT DOCUMENTS

| | | |
|---|---|---|
| CN | 101587495 A | 11/2009 |
| CN | 101763357 A | 6/2010 |
| EP | 2306290 A2 | 4/2011 |
| EP | 2466921 A2 | 6/2012 |
| EP | 2728481 A1 | 5/2014 |
| EP | 2824558 | 1/2015 |
| WO | 03088080 A1 | 10/2003 |
| WO | 2009054619 A2 | 4/2009 |
| WO | 2012075315 A2 | 6/2012 |
| WO | 2013173940 A1 | 11/2013 |
| WO | 2014105922 A1 | 7/2014 |

(56) References Cited

FOREIGN PATENT DOCUMENTS

| WO | 2014146265 A1 | 9/2014 |
|---|---|---|
| WO | 2016/064857 A1 | 4/2016 |
| WO | 2017059388 A1 | 4/2017 |

OTHER PUBLICATIONS

International Search Report and Written Opinion for PCT Application PCT/US2016/055055, dated Dec. 5, 2016, 12 pages.
Minkov, et al., "Extracting Personal Names from Email: Applying Named Entity Recognition to Informal Text", Proceedings of Human Language Technology Conference and Conference on Empirical Methods in Natural Language Processing, available at https://www.cs.cmu.edu/~rcwang/papers/emnlp-2005.pdf, Oct. 1, 2005, pp. 443-450.
Collobert, et al., "Natural Language Processing (almost) from Scratch", Journal of Machine Learning Research, vol. 12, Aug. 1, 2011, pp. 2493-2537.
Final Office Action received for U.S. Appl. No. 14/465,265, mailed on Apr. 27, 2017, 23 pages.
International Search Report and Written Opinion received for PCT Patent Application No. PCT/US2016/062475, dated Mar. 9, 2017, 9 pages.
Non Final Office Action for U.S. Appl. No. 14/451,389, dated Jul. 1, 2016, 11 pages.
Non Final office Action for U.S. Appl. No. 14/451,390, dated Jul. 13, 2016, 15 pages.
Non Final Office Action for U.S. Appl. No. 14/451,393, dated May 25, 2016, 26 pages.
Non Final Office Action for U.S. Appl. No. 14/451,396, dated Jul. 1, 2016, 7 pages.
Non Final Office Action for U.S. Appl. No. 14/712,679, dated Aug. 26, 2016, 10 pages.
Non Final Office Action for U.S. Appl. No. 14/465,265, dated Oct. 6, 2016, 19 pages.
Non Final Office Action for U.S. Appl. No. 14/724,965, dated Sep. 16, 2016, 15 pages.
Notice of Allowance for U.S. Appl. No. 14/451,396, dated Oct. 17, 2016, 7 pages.
Final Office Action received for U.S. Appl. No. 14/451,393, dated Oct. 21, 2016, 31 pages.
U.S. Appl. No. 14/465,265, filed Aug. 21, 2014, 46 pages.
U.S. Appl. No. 14/451,385, filed Aug. 4, 2014, 109 pages.
U.S. Appl. No. 14/724,965, filed May 29, 2015, 54 pages.
U.S. Appl. No. 14/872,582, filed Oct. 1, 2015, 43 pages.
Adistambha et al., "Efficient Multimedia Query-by-Content from Mobile Devices", Computers & Electrical Engineering, vol. 36, Issue 4, Jul. 2010, pp. 626-642.
"The new IFTTT is here", IFTTT Blog (https://ifttt.com/blog/2016/11/the-new-ifttt-is-here), printed Nov. 3, 2016, 6 pages.

* cited by examiner

305

During the basketball tournament Brad Pitt led the scoring with 32 points  315  320

Centered Selection 310    FIG. 3A 325  330  335

SIMULATED HYPERLINKS ON A MOBILE DEVICE BASED ON USER INTENT AND A CENTERED SELECTION OF TEXT

BACKGROUND

Due to the use of mobile devices, such as smartphones and tablets, user interaction with mobile applications has been increasing. As users move away from web-based browsers to using mobile devices they often lose the ability to easily transfer data from one mobile app to another. In general, mobile applications are single purpose and very good at one specific thing, but moving information between mobile applications can be cumbersome and a user may not know which app is good for a given purpose, or even when to look for an app to help them out.

SUMMARY

Implementations provide simulated hyperlinks for content generated on a mobile device. The simulated hyperlink may perform an operation or provide the user with the opportunity to select between two operations after receiving an action from the user (e.g., a long tap, hard tap, etc.) indicative of intent to initiate an operation. The operations may be intents for other mobile applications and can be based on a simulated hyperlink model trained using a mapping of websites to mobile applications and on a repository of crawled documents with anchor tags. A client device employing disclosed implementations makes a centered selection from the content closest to a location of the action. The centered selection can include a fixed quantity of words appearing to the right of and to the left of a center word, e.g., a word or text equivalent for an image located closest to a location of the action. The system may pad the fixed quantity of words if needed, e.g., to avoid using words in other sections or paragraphs. The centered selection is used to provide context for the model to select an operation and make an intelligent selection from the centered selection to use as a parameter for the operation. The system may automatically perform the operation, may get user approval prior to performing the operation, or may offer two or more operations.

According to certain aspects of the disclosure, a mobile device may include a display device, at least one processor, and memory storing instructions that, when executed by the at least one processor, cause the mobile device to perform operations including generating a centered selection responsive to detecting an action on content displayed on the display device, providing the centered selection to a simulated hyperlink model, the simulated hyperlink model being trained to predict an operation given a centered selection, the operation being associated with an intent for a mobile application, and initiating at least one of a) display of a user interface permitting selection of the operation, which uses the intent, or b) performance of the operation using the intent. The simulated hyperlink model may also be trained to provide an intelligent selection from the centered selection and initiating the operation occurs using the intelligent selection as a parameter for the intent.

According to certain aspects of the disclosure, a method includes identifying, from a document corpus, one or more documents having a hyperlink to a whitelisted website, the whitelisted website being one of a plurality of websites in a mapping of websites to mobile applications, generating positive training examples for a simulated hyperlink model using the one or more documents, each positive training example having a centered selection generated from the respective document, a website, a weight corresponding to a page rank of the website, and a mobile application mapped to the website, and training the simulated hyperlink model, using the positive training examples, to predict an operation for the mobile application given the centered selection.

According to certain aspects of the disclosure, a method includes generating, responsive to detecting a simulated hyperlink indication, a centered selection from content displayed on a display of a mobile computing device, providing the centered selection to a simulated hyperlink model, the simulated hyperlink model being trained to predict an operation given the centered selection, the operation being associated with an intent for a mobile application, and initiating the operation using the intent.

In one general aspect, a computer program product embodied on a computer-readable storage device includes instructions that, when executed by at least one processor formed in a substrate, cause a computing device to perform any of the disclosed methods, operations, or processes. Another general aspect includes a system and/or a method for extracting text displayed on a screen in response to a user action and providing an operation for selected portions of the text located proximate the location for the action, substantially as shown in and/or described in connection with at least one of the figures, and as set forth more completely in the claims.

One or more of the implementations of the subject matter described herein can be implemented so as to realize one or more of the following advantages. As one example, implementations may provide a way for a user to seamlessly transfer information between mobile applications, enabling a user to lookup additional information with minimal effort. As another example, implementations may improve the user experience by suggesting applications that can help the user find/handle information, even though the user may not have knowledge of the application. Thus implementations help the user discover more effective or popular tools. As another example, implementations improve the user experience by helping the user perform tasks more quickly, e.g. with fewer gestures from the user. In some implementations, the operations suggested may be customized for the user of the mobile device, making it more likely that the user finds the suggested operation helpful. Implementations also provide operations for any selected text, not just text that corresponds to an entity in a personal or public knowledge graph. Thus, implementations have broader utility than entity-based operation suggestion systems. Implementations improve the user experience by predicting applications that help the user find out more information about a selection and by enabling the user to navigate to the application with minimal input from the user. Implementations also provide context for operation selection, generating better or more accurate suggested operations, which can allow for automatic initiation of the operation with higher accuracy. These advantages all improve the user experience.

The details of one or more implementations are set forth in the accompanying drawings and the description below. Other features will be apparent from the description and drawings, and from the claims.

BRIEF DESCRIPTION OF DRAWINGS

FIG. 3A is another example display of a mobile computing device and a centered selection generated responsive to an action, in accordance with the disclosed subject matter.

Like reference symbols in the various drawings indicate like elements.

DETAILED DESCRIPTION

Implementations include systems and methods that automatically select text in response to a user action and predict or automatically perform an operation for the selected text. The system may perform the operation using an intelligent selection taken from a centered selection that is based on a location of the action. The intelligent selection may be text displayed on the screen or text equivalent for an image displayed on the screen. The text or image displayed on the screen need not be an existing hyperlink. In other words, the application that generated the text or image for display did not associate the operation with the text/image. Instead, the action, which differs from a single-click action typically associated with intent to follow a hyperlink, triggers a classifier that predicts the operation for the text or image based on surrounding context. The context may be derived from the content surrounding the location of the action. The context may be in the form of a centered selection, which includes text or padding tokens surrounding the text (or text equivalent for an image) closest to a location of the action. The operation predicted by the classifier is not a default action, such as a copy or insert operation, but is predicted based on the context of the action, e.g., the centered selection.

The system may determine the operation based on the centered selection and may automatically perform the operation or may ask the user to confirm performance of the operation. The operation may be for a mobile application or a type of mobile application. The operation may initiate launch of a mobile application corresponding to the operation with an intent that takes a selected portion, e.g., intelligent selection, from the centered selection as a parameter. An intent is an operation supported by a mobile application. A search intent and a share intent are common types of intent. The search intent allows the system to link to, or activate, a mobile application in its search state given a query parameter. The system may use nonstandard intents as well. For example, a mobile applicant may indicate an intent in a manifest file. Such nonstandard intents are supported by the mobile application but not necessarily by the operating system. In general, an operation may include any intent that can take the intelligent selection as a parameter. The system can operate across all applications used on a mobile device, making the user experience consistent. The simulated hyperlink functionality thus need not be limited to a particular mobile application. Nor is the simulated hyperlink functionality limited to recognized entities, e.g., entities represented in a personal or public knowledge base. Moreover, the operations performed via a simulated hyperlink may be for mobile applications that the user has not yet installed and, thus, can serve as a way to inform the user about useful mobile applications.

Figure 1:
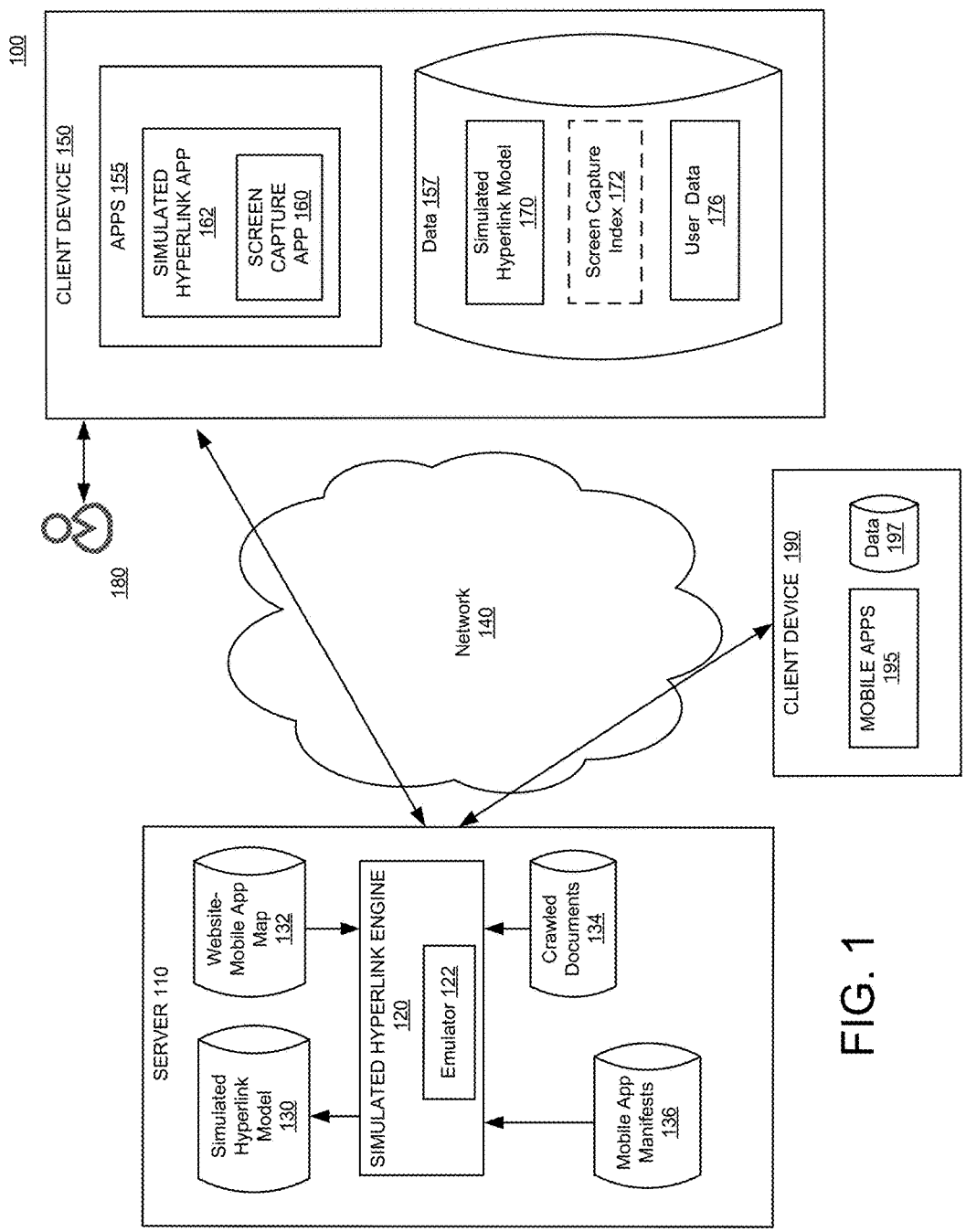
FIG. 1 is a block diagram illustrating an example system in accordance with the disclosed subject matter.

FIG. 1 is a block diagram of a simulated hyperlink system in accordance with an example implementation. The system 100 may be used to initiate an operation in response to an action by the user based on content displayed on a mobile device, even when the action is performed on content that is not a hyperlink or otherwise actionable. The operation may be an intent (e.g., standard or nonstandard) for a mobile application or a copy command, or a user interface that enables the user to select from among two or more operations or to install a mobile application the user has not yet installed on the mobile device. In some implementations, the operation may also launch a web mirror for the mobile application. When a mobile application is represented by the operation, the mobile application may be referred to as the destination application and the mobile application that generated the content selected by the user may be considered a source application. The simulated hyperlink system provides a way to move content from the source application to the destination application with no input from the user except the action. The operation(s) offered or performed in response to the action may be based on a model, e.g., a machine learning model trained to predict one or more operations given a centered selection. The depiction of system 100 in FIG. 1 is a client-server system, with some data processing occurring at a server 110. However, other configurations and applications may be used. For example, the data processing may occur exclusively on the client device 150. In some implementations, a user of the client device 150 may indicate that portions of the processing be performed at the server 110. Thus, implementations are not limited to the exact configurations illustrated.

Figure 6:
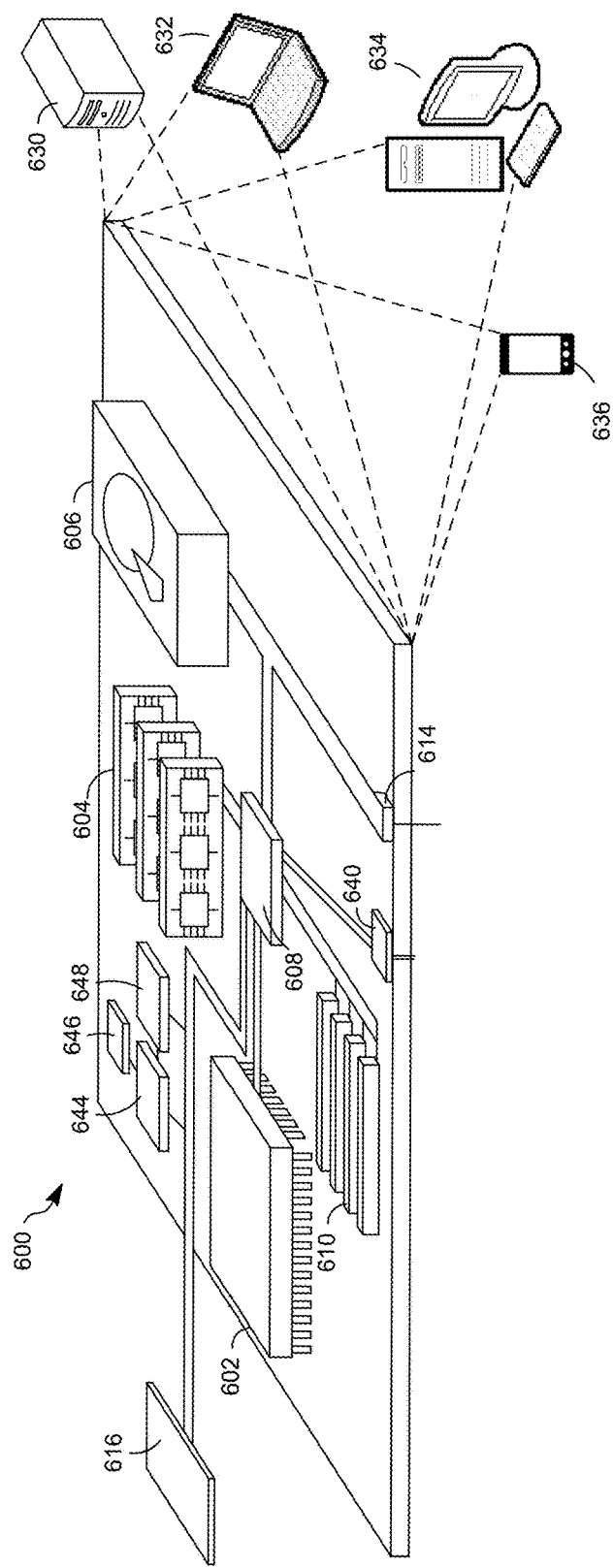
FIG. 6 shows an example of a computer device that can be used to implement the described techniques.
Figure 7:
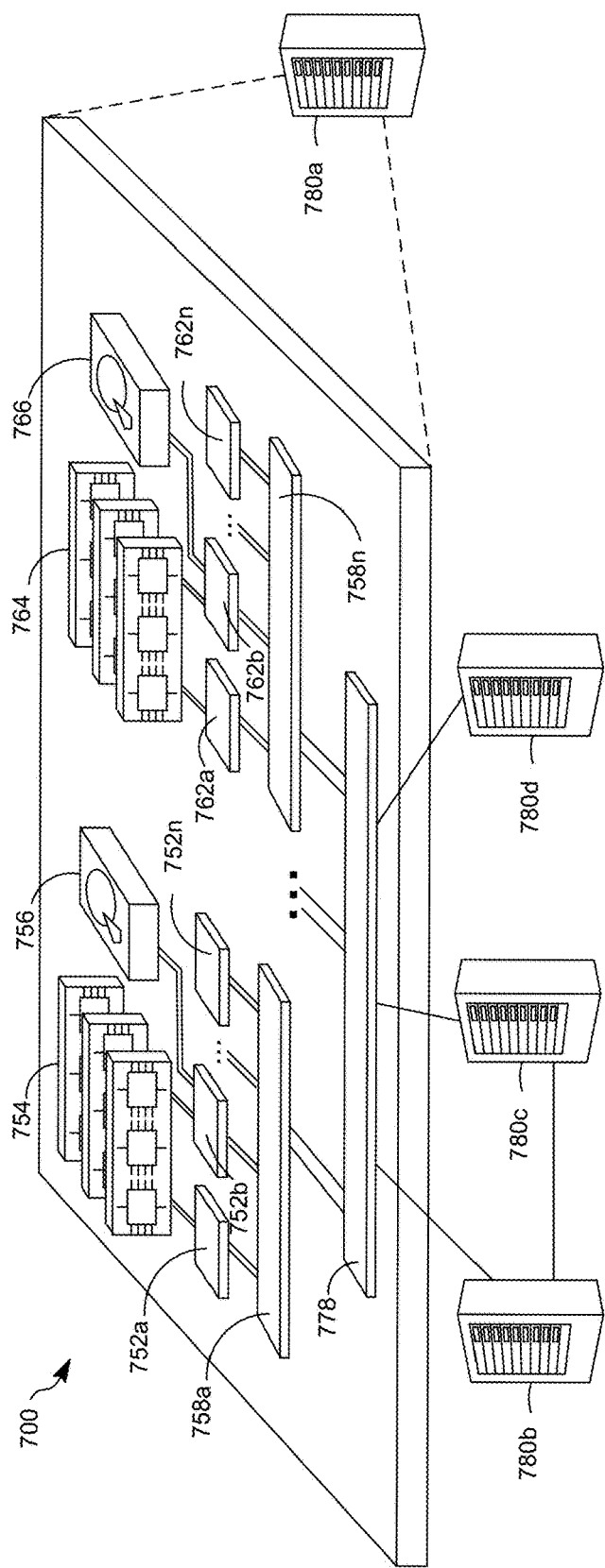
FIG. 7 shows an example of a distributed computer device that can be used to implement the described techniques.

The simulated hyperlink system 100 may include a server 110, which may be a computing device or devices that take the form of a number of different devices, for example a standard server, a group of such servers, or a rack server system. For example, server 110 may be implemented in a distributed manner across multiple computing devices. In addition, server 110 may be implemented in a personal computer, for example a laptop computer. The server 110 may be an example of computer device 600, as depicted in FIG. 6, or system 700, as depicted in FIG. 7. Server 110 may include one or more processors formed in a substrate configured to execute one or more machine executable instructions or pieces of software, firmware, or a combination thereof. The processors can be semiconductor-based—that is, the processors can include semiconductor material that can perform digital logic. The server 110 can also include one or more computer memories. The memories, for example, a main memory, may be configured to store one or more pieces of data, either temporarily, permanently, semi-permanently, or a combination thereof. The memories may include any type of storage device that stores information in a format that can be read and/or executed by the one or more processors. The memories may include volatile memory, non-volatile memory, or a combination thereof, and store modules or engines that, when executed by the one or more processors, perform certain operations. In some implementations, the modules may be stored in an external storage device and loaded into the memory of server 110.

The modules of the simulated hyperlink system 100 may include a simulated hyperlink engine 120. The simulated hyperlink engine 120 may be configured to generate training examples for training the simulated hyperlink model 130 based on a mapping 132 of whitelisted websites to mobile applications. The whitelisted websites may be websites that are useful for performing operations. In other words, the websites may be websites that include a search interface and provide content in response to a query. Non-exhaustive examples of such websites include shopping sites, wikis, reservation sites, rating sites, travel sites, ticket sites, etc. In some implementations, the whitelist and the mapping of whitelisted websites to mobile applications is curated by hand and provided to the simulated hyperlink engine 120. In some implementations, an intent (e.g., search, share, etc.) may be included in the mapping 132.

In some implementations, the simulated hyperlink engine 120 (or another module) may generate the whitelist and the mapping 132. For example, the simulated hyperlink engine 120 may search mobile application manifests 136 to determine websites mentioned in the manifests 136. Such manifests 136 conventionally include information about an application, such as the developer, an icon, a description, a version, etc. Some of this information may be used to help users decide whether to install the application. Some of the information may be intended for other application developers, such as application programming interfaces (APIs), and intents supported by the mobile application. Some mobile applications may include nonstandard intents and these intents may be identified in the manifests 136. The manifests 136 may thus contain various kinds of data about the mobile application, and sometimes a manifest includes a reference to a website that offers functionality similar to that of the mobile application. Such websites are sometimes referred to as web mirrors. The manifest for a mobile application may be submitted by the mobile application developer to a web store. The simulated hyperlink engine 120 may consider any website mentioned in the mobile application manifests 136 a whitelisted website and may map the website to the mobile application, e.g., by adding the website and mobile application to the website-mobile application map 132. If a mobile application supports more than one intent, the simulated hyperlink engine 120 may add multiple records mapping the website to the mobile application, each one having a different intent.

The mapping may also include other uniform resource indicators (URIs) mapped to a mobile application. While http and https are the most common URI type, the anchor tag of a hyperlink sometimes includes other URIs in the destination. For example, "mailto:" is a URI that can be mapped to an email application and "tel:" is a URI that can be mapped to a dialing application. These non-http URIs may map to a mobile application or mobile application type, as they typically perform a specific function.

In some implementations, the simulated hyperlink engine 120 (or another module) may generate entries in the website-mobile application map 132 using an emulator 122. The emulator 122 may be configured to emulate a client device in a batch environment. In other words, the emulator 122 may be configured to execute a mobile application and determine screen content generated by the mobile application. In some implementations, the emulator 122 may send an intent with a query to a mobile application and determine whether the mobile application returns content, or in other words returns results for the query. In some implementations, the content may be information in a frame buffer. In some implementations, the content may be information used by the operating system to generate a frame buffer. In some implementations, the content may be from an API. When the mobile application does return content, the emulator 122 may find an equivalent website, e.g., one that returns the same or similar results for the query. When the emulator 122 finds an equivalent website the emulator 122 may add the website and the mobile application and the intent to the website-mobile application map 132.

The simulated hyperlink engine 120 may use the website-mobile application map 132 and crawled documents 134 to generate positive training examples for training the simulated hyperlink model 130. The crawled documents 134 may include documents available via the Internet and may represent an index generated from the source documents. The crawled documents 134 may also include other documents that link to documents available via the Internet. The simulated hyperlink engine 120 may be configured to inspect hyperlinks in crawled documents 134 for hyperlinks that link to a website or URI in the map 132. When such a hyperlink is identified, the system may use it to generate a positive training example for the simulated hyperlink model 130. For example, the anchor text (i.e., the words that are part of the hyperlink and appear between the anchor-begin tag and anchor-end tag) may be used to predict the mobile application associated with the whitelisted website. In other words, the simulated hyperlink engine 120 may include a training example that teaches the simulated hyperlink model 130 that given the anchor text, the mobile application is a good candidate for finding more information about the anchor text.

In some implementations, the simulated hyperlink engine 120 may provide a centered selection from the source document in crawled documents 134 with the training example. The centered selection may provide context for helping the simulated hyperlink model 130 predict the mobile application correctly. A centered selection may include the anchor text padded on either side by words surrounding the hyperlink from the source document. In some implementations, the centered selection has a fixed length, or in other words a preselected quantity of words. For example, the centered selection may include thirteen words. In some implementations, the anchor text may represent the middle of the centered selection. Thus, for example, if a hyperlink includes three words as part of the anchor tag (i.e., after the begin-anchor tag and before the end-anchor tag), the three words may occur in positions 6, 7, and 8 of the centered selection. The anchor text may be padded on either side by words from the source document that appear just prior to and just after the anchor text. In some implementations, words are not taken from a different paragraph, page, or section in the source document. In such an implementation, the centered selection may be padded with a token that represents the absence of words. For example, if the anchor text appears as the first three words of a sentence in the source document, the centered selection may include five padding tokens, followed by the three words, and then followed by five more words from the sentence. The centered selection provides the context of surrounding words to help the simulated hyperlink model 130 determine between different websites used in different contexts with the same or very similar anchor text. The simulated hyperlink engine 120 may generate numerous training examples using the crawled documents 134.

In some implementations, the simulated hyperlink engine 120 may increase the quantity of positive examples by clustering similar mobile applications. For example, the simulated hyperlink engine 120 may cluster mobile applications, e.g., based on data available at a web store or in the mobile application manifests 136, and may use the clusters to create additional training examples. In some implementations, mobile applications in a cluster may be considered a type of mobile application, i.e., a mobile application type, and the website-mobile application map 132 may map the website to the cluster, or in other words the type of mobile application. Thus, any mobile application in the cluster maps may map to the website and the simulated hyperlink engine 120 may generate training examples for each mobile application in the cluster for anchor text that corresponds to the website. In some implementations, the training example may predict the mobile application type, or in other words the cluster, given the anchor text. In some implementations, the simulated hyperlink engine 120 may use the emulator 122 to verify whether the mobile applications in a cluster produce similar results. For example, the emulator 122 may be provided the anchor text in a search intent for the mobile applications in a cluster and may compare results returned for the anchor text. If a particular mobile application in the cluster does not provide similar results to the other mobile applications in the cluster, that particular mobile application may be removed from the cluster and used as a negative training example. Accordingly, the simulated hyperlink model 130 may be trained to exclude certain applications. Similarly, the simulated hyperlink engine 120 may use information in the crawled documents 134 and mobile application manifests 136 to generate other negative training examples. For example, if a particular query lacks a web mirror for a mobile application, i.e., the simulated hyperlink engine 120 is unable to make a good match between highly ranked web pages for the query and a corresponding mobile application, the query may be used as a negative example for one or more mobile applications. In some implementations, the simulated hyperlink engine 120 may also generate other negative training examples, for example by pairing anchor text or a centered selection with a mobile application/website that does not match the website in the anchor tag of the source document.

In addition to predicting an operation given a centered selection, the simulated hyperlink model 130 may also be trained to make an intelligent selection from the centered selection. In the training example, the text that is the anchor text may be a positive example of the intelligent selection for that centered selection. This enables the simulated hyperlink model 130 choose text from future center selections that most likely represents the main concept and enables the model to select an entire noun phrase (e.g., President of the United States) and not just one word. Thus, the simulated hyperlink model 130 may provide an intelligent selection as well as one or more operations as output. Each operation provided as output may have an associated probability score. The probability score may represent how confident the model is that the operation is correctly predicted for the given centered selection.

The simulated hyperlink model 130 may be any type of machine-learning algorithm, such as a long short-term memory (LSTM) neural network, feed-forward neural network, a support vector machine (SVM) classifier etc., that can predict one or more operations (e.g., intents for mobile applications) given a query. In some implementations, the simulated hyperlink engine 120 may train the simulated hyperlink model 130 to accept the query character by character and the model 130 may make a prediction only when the end of input character is encountered. In such implementations, the model 130 uses a very small vocabulary making it compact and suitable for storage and execution on a mobile device. In some implementations, the model 130 may include a character embedding layer, two LSTM layers with 64 nodes each, and a softmax classification layer. In some implementations, the model 130 may be trained to take words as input instead of characters.

The system may push the simulated hyperlink model 130 to one or more client devices, e.g., client device 150 and client device 190. Client device 150 may be any mobile personal computing device, such as a smartphone or other handheld computing device, a tablet, a wearable computing device, etc., that operates in a closed mobile environment rather than a conventional open web-based environment. Client device may also be any personal computing device. Client device 150 may be an example of computer device 600, as depicted in FIG. 6. Client device 150 may be one mobile device used by user 180. User 180 may also have other mobile devices, such as client device 190.

Client device 150 may include one or more processors formed in a substrate configured to execute one or more machine executable instructions or pieces of software, firmware, or a combination thereof. The client device 150 may thus include one or more computer memories configured to store one or more pieces of data, either temporarily, permanently, semi-permanently, or a combination thereof. The client device 150 may thus include applications 155, which represent machine executable instructions in the form of software, firmware, or a combination thereof. The components identified in the applications 155 may be part of the operating system. In some implementations the applications 155 may be mobile applications developed for a mobile processing environment. Conventionally, mobile applications operate in a closed environment, meaning that the user employs separate applications to perform activities usually performed in a web-based browser environment. For example, rather than going to bookit.com to book a hotel, a user of the client device 150 can use a mobile application in mobile applications 155 provided by bookit.com. As previously discussed, a mobile application may have web pages that mirror the mobile application, e.g., providing the same or similar content as the mobile application. Thus, in some implementations, the web page(s) (e.g., at bookit.com) may be considered a web mirror of the mobile application (e.g., an app provided by or associated with bookit.com).

The applications 155 may include a screen capture application 160 and a simulated hyperlink application 162. In some implementations, one or more of these applications can be provided by the operating system of the client device 150. In some implementations, one or more of these applications can be downloaded and installed by the user.

The screen capture application 160 can include various functionalities. In some implementations, the screen capture application 160 may be configured to get textual information represented on the screen from an application program interface (API). In some implementations, the screen capture application 160 may be built into the operating system, which can determine the content of text fields displayed on the current screen. In some implementations, the screen capture application 160 may be configured to capture the current screen of the client device 150. The screen capture application 160 may capture the screen by copying or reading the contents of the device's frame buffer. The captured screen may, thus, be an image and is referred to as a captured image. In some implementations, the screen capture application 160 may capture part of the screen. For example, the screen capture application 160 may capture some region around the location of the action from the user, i.e., the simulated hyperlink indication. The screen capture application 160 may capture a partial region measured in pixels around the location of the action or may ask the API for a particular amount of on-screen text surrounding the location of the action. Thus, the screen capture image may represent less than all the content displayed on the screen, e.g., a partial screen capture image.

The screen capture application 160 may capture the screen at intervals. The interval can be small, for example every half second or every second. In some implementations, the screen capture application 160 may be configured to capture the screen every time a touch event occurs (e.g., every time the user touches the screen to scroll, zoom, click a link etc.), in response to an explicit user request or command, or when the device transitions from one mobile application to another mobile application. In some implementations, the screen capture application 160 may increase the interval at which a screen capture occurs when the screen does not change. In other words, when the screen is static, the screen capture application 160 may capture images less often. The screen capture application 160 may provide the captured screen images and metadata to a recognition engine, which may be on the client device 150 or a server, such as server 110. The metadata may include the timestamp, the mobile device type, a mobile device identifier, the mobile application running when the screen was captured, e.g., the application that generated the screen, etc. In some implementations, the metadata may also include which applications are active, the location of the device, ambient light, motion of the device, etc. The system may use this additional device information to assist in content analysis (e.g., disambiguation), generating suggested operations (e.g., reducing the quantity of suggestions when the device is moving, deciding what content is most relevant), etc.

In some implementations, the screen capture application 160 can include an indexing engine configured to index a screen capture image according to the text, entities, images, logos, etc. identified in the image. Thus, for example, the indexing engine may generate index entries for a captured image. In some implementations the indexing engine may be on a server, such as server 110, and the screen capture application 160 may provide the captured image and/or recognized items in the captured image to the server. The index may be an inverted index, where a key value (e.g., word, phrase, entity, image, logo, etc.) is associated with a list of images that include the key value or from which the key value was recognized. The index may include metadata (e.g., where on the captured image the key value occurs, a rank for the key value for the image, etc.) associated with each captured image in the list. In some implementations, the index may also include a list of captured images indexed by a timestamp. The indexing engine may store the index in memory, for example in screen capture index 172. Of course, in some implementations the system may store the index in a user account on a server in addition to or instead of on the client device 150. The user of the client device 150 may control when the screen capture application 160 is active. For example, the user may specify that the screen capture application 160 is active only when other specified mobile applications 155 are running (e.g., only when in a social media mobile application). The user may also manually turn the screen capture application 160 on and off, for example via a settings application. In some implementations, the user may invoke the screen capture application 160 with a gesture or action that also invokes the simulated hyperlink application 162.

The client device 150 may also include a simulated hyperlink application 162. The simulated hyperlink application 162 may be configured to use simulated hyperlink model 170 or simulated hyperlink model 130 to determine an operation to perform in response to an action, the action being a gesture, input, or a series of gestures or inputs from a user that signals intent to initiate the simulated hyperlink application 162. The action is referred to as a simulated hyperlink indication. In some implementations, the action may also invoke the screen capture application 160. In some implementations, the action, i.e., a simulated hyperlink indication, may be a long press, a two finger click, a swipe, etc. In some implementations, the simulated hyperlink indication may be dragging a selection control to the portion of the screen that receives the selection. In some implementations, the selection control may be an icon that can be moved and released. The release of the icon may be the action that initiates the simulated hyperlink. In some implementations, the simulated hyperlink indication may verbal, e.g., a voice command to select a word or words or an image displayed on the screen. If the action occurs on a portion of the screen with an image, e.g., via the long press over an icon or picture, the simulated hyperlink application 162 may be configured to determine text associated with the image and use the text in place of the image. For example, via image recognition the image may be determined to be of an entity in a knowledge base that has a title, nickname, or common name associated with it.

Responsive to the action, simulated hyperlink application 162 may determine text to provide to the simulated hyperlink model 170. In some implementations, this may include using the screen capture application 160 to perform recognition on the content displayed on the screen. In some implementations, the screen capture application 160 may have already performed recognition on the content. The simulated hyperlink application 162 may determine the text that is located closest to a location of the action. The location of the action may be the screen coordinates that correspond to the action. The simulated hyperlink application 162 may determine a centered selection based on the location. For example, the simulated hyperlink application 162 may make the word closest to the location of the action the center word and include words to the left of this center word and to the right of this centered word as the centered selection. The number of words to the left and the number of words to the right may be equal. In some implementations, the simulated hyperlink application 162 may avoid using words from a different paragraph or section in the centered selection. For example, if the center word is the first word in a new paragraph, the simulated hyperlink application 162 may use padding tokens instead of words from the previous paragraph to the left of the center word.

The simulated hyperlink application 162 may use the selection, e.g., the text closest to the location of the action or the centered selection, as input to the simulated hyperlink model. The simulated hyperlink application 162 may use a simulated hyperlink model, such as simulated hyperlink model 170 or simulated hyperlink model 130, to determine suggested operations for the centered selection. In some implementations, the simulated hyperlink model 170 may be a copy of the simulated hyperlink model 130. In some implementations, the simulated hyperlink model 170 may be a personalized copy of the simulated hyperlink model 130. For example, the client device 150 may receive the simulated hyperlink model 130 from the server 110, or an updated simulated hyperlink model 130, and may perform further training of the model on the client device 150. For instance, the simulated hyperlink application 162 may use user data 176, which may include queries submitted from the client device 150 or information on the use of certain mobile applications 155, or screen capture index 172 to generate or re-weight positive training examples for the simulated hyperlink model 170. These additional training examples may personalize the simulated hyperlink model 170 so that the simulated hyperlink application 162 offers suggested or predicted actions more relevant to the user 180. For example, if user 180 uses a first reservation mobile application often, but never uses a second reservation mobile application, the simulated hyperlink application 162 may upweight the first reservation mobile application for the model so the simulated hyperlink application 162 suggests the first reservation application and not the second one.

The simulated hyperlink model 170 is configured or trained to predict an intelligent selection and one or more operations given content from the screen. For example, the simulated hyperlink application 162 may provide the model 170 with a centered selection and the model 170 may provide one or more suggested operations as well as an intelligent selection from the centered selection. A suggested operation includes an intent for a mobile application. The intent may take the intelligent selection as a parameter. The operation can also include a default operation, such as a copy operation or a search intent for an Internet search engine. For example, the copy operation may copy the intelligent selection to the clipboard and the search engine intent may submit the intelligent selection as an Internet query. A default operation may be the operation if no other operation has a high enough confidence or when no operation is predicted. In other words, if the probability score for a predicted operation is not high enough (e.g., doesn't reach a minimum threshold), the simulated hyperlink application 162 may perform a default operation on, e.g., a copy of, the intelligent selection. In some implementations, the system may generate a user interface that offers the copy operation or other default operation and one or two of the suggested operations with highest probability scores for the user to select from. The simulated hyperlink application 162 may provide a user-interface that offers the suggested operation(s) to the user of the device in a manner consistent across mobile applications. In some implementations, the suggested operations may be in the form of a selectable control. The control can be an overlay displayed on top of the screen being displayed, an underlay displayed behind the screen being displayed, or information configured to be added to the current screen in the display buffer of the mobile device. In other words, the suggested operation control represents information added to a screen generated at the mobile device, whether displayed over, under, or integrated into the screen when it is displayed.

The suggested operation control may be configured to detect a selection that initiates the corresponding action, e.g., in the form of initiating an intent. The suggested operation thus, acts like a hyperlink in an HTML-based document. But unlike an HTML hyperlink, the content selected by the user via the action does not need to be associated with a destination prior to the action, i.e., the simulated hyperlink indication. Thus, the simulated hyperlink system 100 can turn any content displayed on the screen into a hyperlink and can provide the suggested operation control for any mobile application running on the mobile device, making operations consistent across mobile applications. This consistency improves the user experience.

Although illustrated as executing on the client device 150, in some implementations, the simulated hyperlink application 162 may be a module executing on a server, such as server 110. In such implementations, the screen capture application 160 may provide the content recognized in a captured image and the word closest to the location of the action to the simulated hyperlink application 162 at the server and the simulated hyperlink application 162 may provide the screen capture application 160 with the corresponding operation(s) and intelligent selection using the simulated hyperlink model 130. In some implementations, the screen capture application 160 may use the intelligent selection and corresponding operation(s) to provide the interface with suggested operation controls or to automatically perform an operation using the intelligent selection.

When an operation is not performed automatically, the screen capture application 160 may integrate the user interface having the suggested operation controls with a current screen. For example, if the screen capture application 160 receives the predicted operations from the simulated hyperlink application 162, the screen capture application 160 may combine the controls for the predicted operations with the current display content. In some implementations, the screen capture application 160 may generate an overlay, as an underlay, or may interleave the suggested operation controls with the current screen in the display buffer. In some implementations, the screen capture application 160 may be configured to verify that the currently displayed screen is similar enough to the captured screen image before displaying the suggested operation controls. For example, the screen capture application 160 may use the coordinates for the control or for the corresponding intelligent selection to determine a visual cue from the captured image and compare the visual cue with the same coordinates for the currently displayed image. In some implementations, the screen capture application 160 may be configured to look a short distance for visual elements in the current image that are similar to those for the visual cue. If found, the screen capture application 160 may adjust the coordinates of the suggested operation controls to match the movement of the underlying screen. In some implementations, the screen capture application 160 may initiate an activity or mode that displays the captured image, the selected text or image, and the operation controls on top of the current screen. The previously captured image, selected text or image, and operations may be displayed until the user selects an action or cancels the display (e.g., with a cancel or 'go-back' command).

In some implementations, the simulated hyperlink application 162 may use a ranking engine to determine which suggested operations from the model to display. For example, the simulated hyperlink application 162 may choose a quantity (e.g., 3 or 4) of the top ranking, or in other words most probable, operations. As another example, the simulated hyperlink application 162 may choose any operation with a probability score higher than a specified threshold, or a combination of quantity and a threshold. In some implementations, the quantity or threshold may be dependent on metadata about the device, e.g., a lower quantity or higher threshold when the device is moving. In some implementations, the display of the suggested actions may be scrollable, e.g., to allow the user to select from more actions than are initially displayed.

The client device 150 may include data stores 157, which are stored in the memory of the client device 150 and used by the applications 155. In some implementations, the data stores 157 may include the simulated hyperlink model 170, the screen capture index 172, and the user data 176. One or more of these data stores may be associated with a user account or profile. Thus, the data stores may also reside on server 110. In addition, one or more of the data stores 157 may be copies of or subsets of data stored on the server 110 or in another location specified by the user. The data stores 157 may be stored on any non-transitory memory.

The client device 150 may be in communication with the server 110 and with other client devices 190 over network 140. Network 140 may be for example, the Internet, or the network 140 can be a wired or wireless local area network (LAN), wide area network (WAN), etc., implemented using, for example, gateway devices, bridges, switches, and/or so forth. Network 140 may also represent a cellular communications network. Via the network 140, the server 110 may communicate with and transmit data to/from client devices 150 and 190, and client device 150 may communicate with other client devices 190 (not shown).

The simulated hyperlink system 100 represents one example configuration and implementations may incorporate other configurations. For example, some implementations may combine one or more of the components of the emulator 122, the simulated hyperlink engine 120, or the simulated hyperlink application 162 into a single module or engine. Similarly, some implementations may combine one or more of the screen capture application 160 and the simulated hyperlink application 162 into a single module or application. Furthermore, one or more of the components of the simulated hyperlink application 162 or the screen capture application 160 may be performed at the server 110, while one or more of the components of the emulator 122 or the simulated hyperlink engine 120 may be performed at the client device 150. As another example one or more of the data stores, such as the mobile application manifests 136, the crawled documents 134, the simulated hyperlink model 130, or website-mobile application map 132 may be combined into a single data store or may be distributed across multiple computing devices, or may be stored at the client device 150. Likewise, one or more of the screen capture index 172 and the user data 176 may be stored at the server 110 or another location specified by the user.

To the extent that the simulated hyperlink system 100 collects and stores user-specific data or may make use of personal information, the users may be provided with an opportunity to control whether programs or features collect the user information (e.g., information about a user's social network, social actions or activities, a user's preferences, or a user's current location), or to control whether and/or how to receive content that may be more relevant to the user. In addition, certain data may be treated in one or more ways before it is stored or used, so that personally identifiable information is removed. For example, search records may be treated so that no personally identifiable information can be determined and/or a user's geographic location may be generalized where location information is obtained (such as to a city, ZIP code, or state level), so that a particular location of a user cannot be determined. Thus, the user may have control over how information is collected about the user and used by a simulated hyperlink system 100. Moreover, capabilities may be provided to determine whether provision of functionality described herein is consistent with rights of use of content, layout, functionality or other aspects of the applications used to display content on the device screen, and set capabilities accordingly. For example, settings may be provided that limit simulated hyperlinks where not doing so could be in contravention of terms of service, content license, or other limitations on use. Such settings may be manually or automatically made, such as by a user when establishing a new service or device use permissions, or by an app installation routine or the like.

Figure 2B:
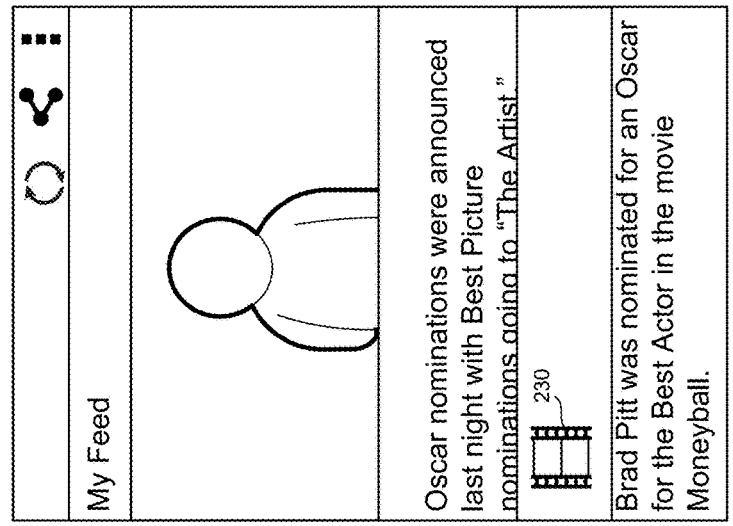
FIG. 2B is an example display of a mobile computing device with a suggested operation for an intelligent selection from the centered selection of FIG. 2A, in accordance with the disclosed subject matter.
Figure 2A:
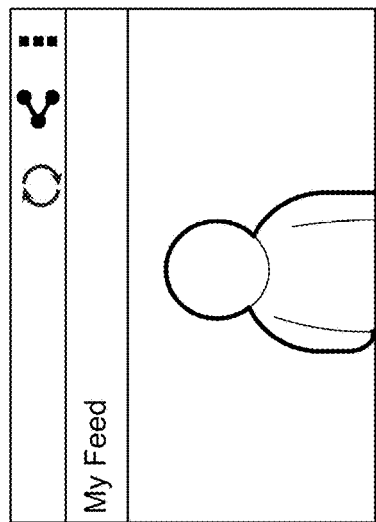
FIG. 2A is an example display of a mobile computing device and a centered selection generated responsive to an action, in accordance with the disclosed subject matter.

FIGS. 2A and 2B are example displays 200a and 200b of a client computing device in accordance with the disclosed subject matter. A simulated hyperlink system, such as system 100 of FIG. 1 may provide the display. In some implementations, the display may be a display of a mobile device, such as client device 150 of FIG. 1. In FIG. 2A the user has performed an action, e.g., a simulated hyperlink indication, at location 205 on the display 200a. The location 205 corresponds most closely to the word "Brad" displayed on the screen by the source program. The word "Brad" is not a hyperlink, e.g., is not associated with any destination by the source program and appears as normal text (e.g., not underlined or a different color than surrounding text, as typical with a hyperlink). The system 100 may use the location 205 to generate centered selection 210. In the example of FIG. 2A, the centered selection 210 includes 13 words taken from content recognized in display 200a. Of course other implementations may include more or fewer words. The center word 215 is "Brad" because it corresponds most closely to location 205. The system 100 may append six words that follow the center word 215. These six words may be considered right context. The system 100 may also prepend six words that appear before the center word 215. These six words are six words of left context.

In the example of FIG. 2A, the system 100 may avoid using text that is associated with another paragraph or section of the content. Thus, the left context or the right context may include padding tokens 220. The padding tokens 220 enable the system 100 to keep the center word 215 centered while avoiding taking words from potentially unrelated context. Thus, because the center word 215 appears at the beginning of a new paragraph in display 200a, the system 100 adds six padding tokens 220 to the left context of the centered selection 210. The paragraph includes more than six words after the center word 215, so the right context includes just words recognized from the content and does not need padding tokens.

The system 100 may provide the centered selection 210 to a simulated hyperlink model. The simulated hyperlink model may provide intelligent selection 225 as well as one or more suggested operation in response to the centered selection 210. In some implementations, the system 100 may select an operation with a highest probability and perform that operation using the intelligent selection 215 as a parameter to an intent for the mobile application that corresponds to the operation. For example, if the operation with the highest probability is a movie wiki application, the system 100 may invoke the wiki application with a search or share intent, taking Brad Pitt as the input for the intent. In such an implementation, display 200b of FIG. 2B is not displayed.

FIG. 2B illustrates an example of a display 200b with a user interface that displays the suggested operation as a control, in accordance with disclosed implementations. For example, operation control 230 may be an icon that represents the movie wiki application. The system may generate the display 200b if the client device does not automatically perform the operation. If the user selects operation control 230, the system 100 may activate the movie wiki application (e.g., switch focus to the movie wiki application or in other words the destination application) with a search or other intent. A search intent is an operating system standard that opens the application in a search state, or in other words a search user interface. Search intents can work with mobile applications and web applications. The search intent may support a parameter, so that the mobile application is provided with the intelligent selection as part of the search intent and opens or activates to a search result page or user interface. Implementations may also use other intents, either standard (i.e., supported by the operating system) or non-standard (i.e., supported by the mobile application but not by the operating system), that can take the intelligent selection as a parameter. Thus, selection of operation control 230 may pass the parameter Brad Pitt as a query to the movie wiki mobile application, cause the client device to open or switch focus to the movie wild application, and the movie wiki mobile application may display a result page for the query. In this manner the system 100 reduces the input needed to perform the selection, search, and context switch required to look up Brad Pitt in the movie wiki application, which improves the user experience. Of course the operation illustrated in FIG. 2B is an example only and other suggested operations may be presented to the user. The presentation of the operation control in FIG. 2B is illustrated in a bar that overlays part of the screen content generated by the source application. Implementations may include other arrangements, such as a carousel display, a circular display, a menu display, a pop-up window or icon, etc. In addition, the user interface of display 200b illustrated in FIG. 2B may be optional, as in some implementations the simulated hyperlink application 162 may automatically initiate the movie wiki application.

FIG. 3A is another example display 300a of a mobile computing device in accordance with the disclosed subject matter. A client device of a simulated hyperlink system, such as system 100 of FIG. 1 may provide the display 300a of FIG. 3A. In the example of FIG. 3A, the user has performed an action, i.e., the simulated hyperlink indication, at location 305. In response, the system 100 may perform recognition on the display 300a to recognize text generated by the source application. The system may determine that location 305 corresponds to the word "Pitt" and make that the center word 315 of a centered selection 310. The system 100 may pad the center word 315 with six words of left context and six words of right context. In the example of FIG. 3A, the system 100 adds one padding token to the left context to avoid using words from a different paragraph while keeping the center word 315 centered. In other implementations, the system 100 may pad the center word with more or fewer words in the left context and right context. The system 100 may provide the centered selection to the simulated hyperlink model. The model may provide intelligent selection 320 and one or more predicted operations for the centered selection.

Figure 3B:
FIG. 3B is an example display of a mobile computing device with two suggested operations for an intelligent selection from the centered selection of FIG. 3A, in accordance with the disclosed subject matter.
Figure 3B:
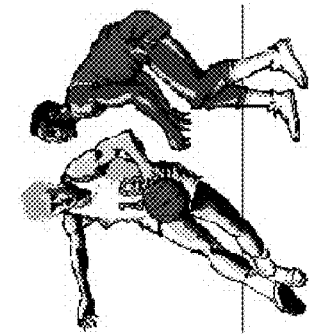
Figure 3B:
Figure 3B:
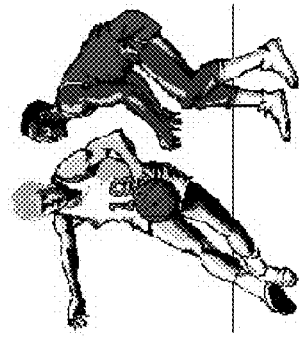
Figure 3B:

FIG. 3B is an example display 300b of a mobile computing device with two suggested operations for an intelligent selection from the centered selection of FIG. 3A, in accordance with the disclosed subject matter. In the example of FIG. 3B, the simulated hyperlink model has provided operation control 330, which may represent a sports news application. However, the model may not be very certain about this choice, for example because the intelligent selection Brad Pitt is more often associated with movies than sports. However, because of the context (e.g., the basketball tournament), the model may not be confident about an operation that represents a movie wiki application either. In the example of FIG. 3B, the system selects the higher ranking operation, e.g., represented by operation control 330, for display in the user interface. In addition, because the system 100 is not very confident about this choice, the system may also provide a copy operation 325 in the user interface. Selection of the copy operation copies the intelligent selection 320 onto a clipboard. In some implementations, this may be the default operation performed automatically when no operations predicted by the model have a sufficiently high confidence or there are no predicted operations. The operation control 330 may be associated with an icon for the sports news mobile application and selection of control 330, or in other words of the operation, may launch the sports news application with a search intent. The search intent may have the intelligent selection 320 as a parameter. Accordingly, the client device may launch the sports news application to a search result screen that has results responsive the query that includes the intelligent selection 320.

The example of FIG. 3B also illustrates a user interface that provides the user with an indication 335 of the intelligent selection 320. The indication 335 may modify the appearance of the text, e.g., by highlighting, circling, or some other method of indicating the text as automatically selected. The indication 335 can be an overlay displayed on top of the screen being displayed, an underlay displayed behind the screen being displayed, or information configured to be added to the current screen in the display buffer of the mobile device. In some implementations, the user interface illustrated in FIG. 3B may provide the user with an opportunity to modify the intelligent selection, e.g., by expanding or contracting the indication 335. In such implementations, such a change may be provided to the model as another training example. This training example may be used to personalize the model (e.g., by updating simulated hyperlink model 170) or may be used as feedback and further training for the general model (e.g., simulated hyperlink model 130). In some implementations, when the user selects an operation control this feedback may be saved as another positive training example (e.g., that the centered selection predicts that selected operation). In some implementations, if a user does not select an operation offered in a user interface, the system may generate a negative training example, which indicates the centered selection does not predict the operation(s) presented. These additional training examples can help increase or decrease the probability scores for the predicted operations, either in a personal copy of the model or the general model.

In some implementations, the user may not have one of the mobile applications installed. For example, the user may not have the sports news application that corresponds to the operation control 330 installed. Selection of the control 330 may cause the device to initiate a download process for the sports news application. Thus, the user interface of display 300b may provide the user with knowledge of operations, or in other words mobile applications, that others consider helpful, even if the user does not know about the mobile applications. In some implementations, if the user does not have the sports news application installed the system may convert the operation to a search intent for an Internet search mobile application, a dictionary app a wiki app, etc., or just a copy operation as discussed above.

The user interfaces illustrated in FIGS. 2A, 2B, 3A, and 3B work on text or images generated by any source application, and not just on text tied to an entity in a knowledge base, text that fits a template for an entity type, or applications that convert certain types of text to a hyperlink. While operation controls are illustrated as icon-based, operation controls could be text based or a combination of text and images. Thus, the operation controls are understood to include text based, image based, or a combination of text and image controls.

Figure 4:
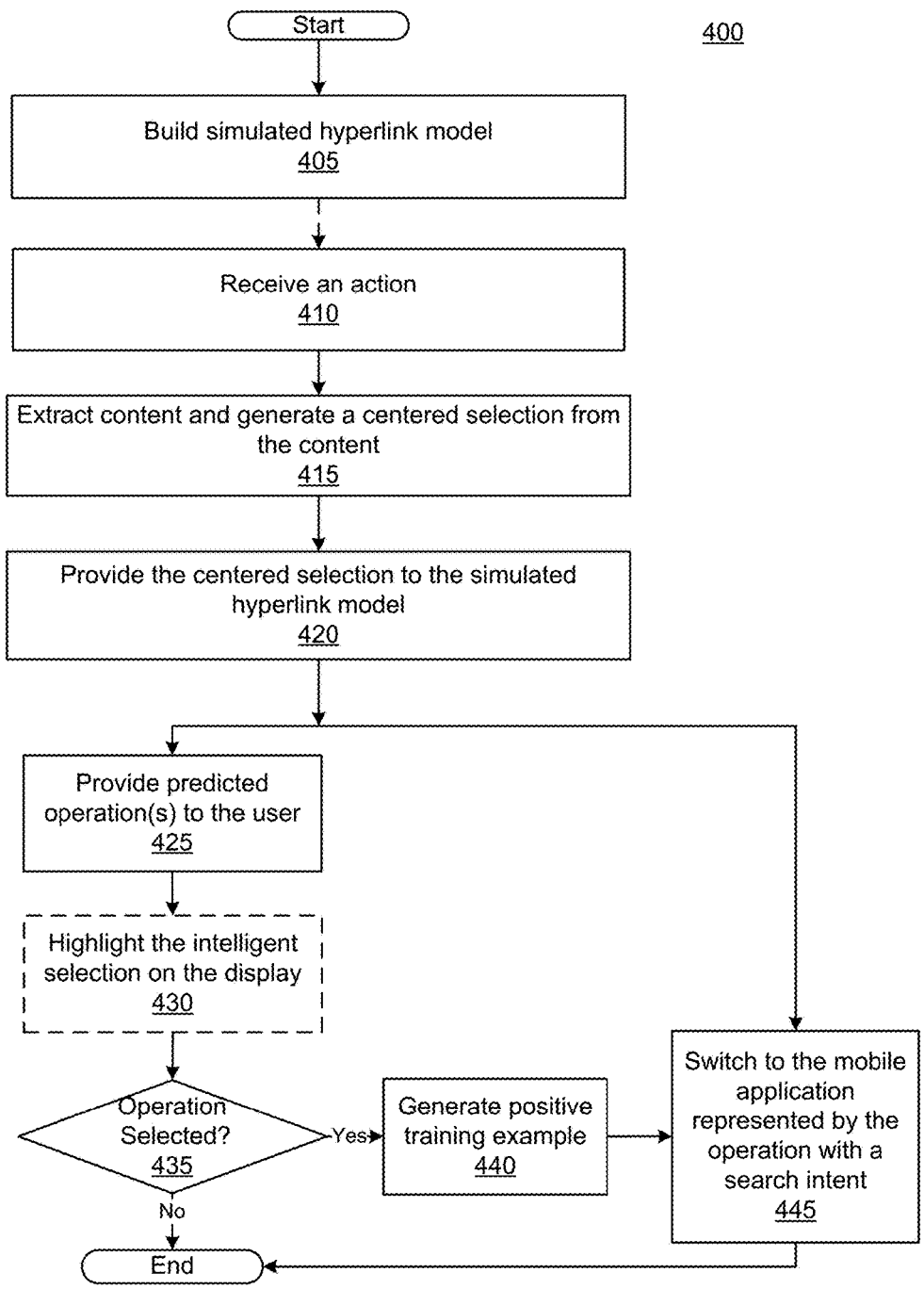
FIG. 4 illustrates a flow diagram of an example process for suggesting operations in response to an action associated with content displayed on a mobile computing device, in accordance with disclosed implementations.
Figure 5:
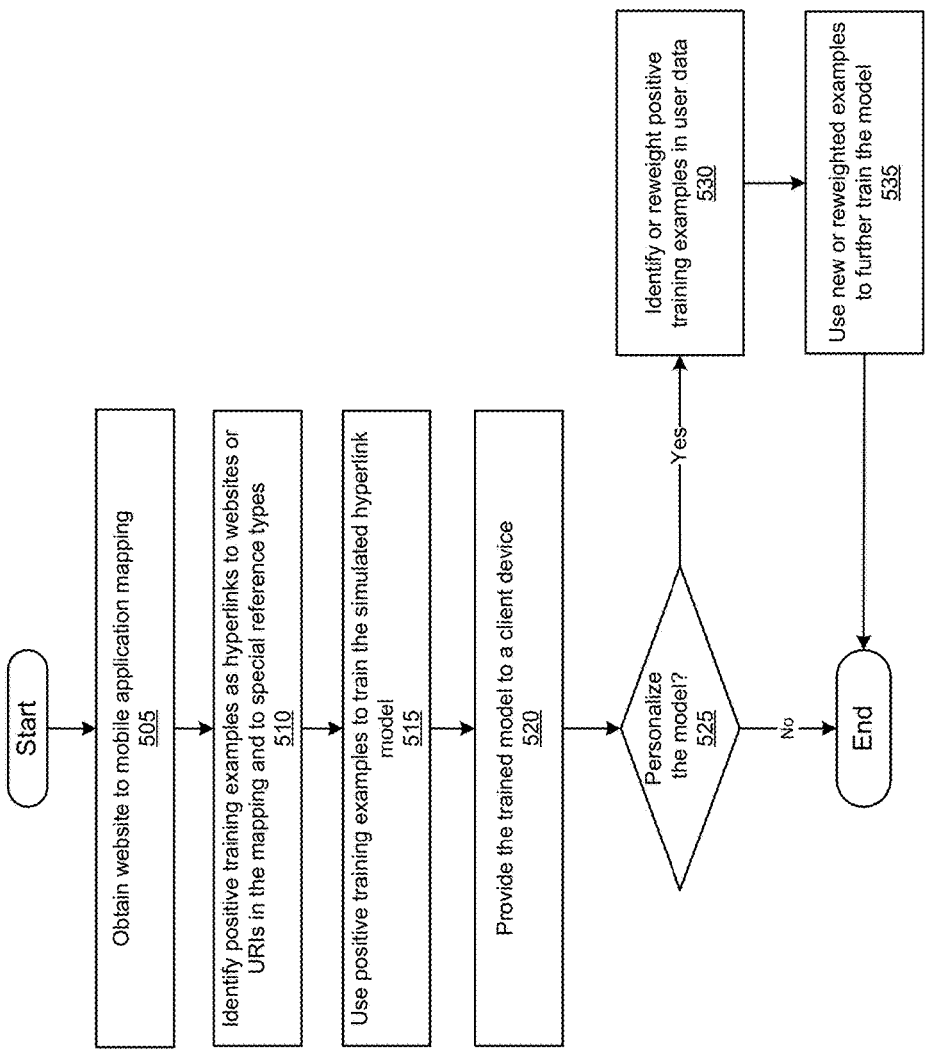
FIG. 5 illustrates a flow diagram of an example process for generating a simulated hyperlink model, in accordance with disclosed implementations.

FIG. 4 illustrates a flow diagram of an example process 400 for suggesting operations in response to an action associated with content displayed on a mobile computing device, in accordance with disclosed implementations. Process 400 may be performed by a simulated hyperlink system, such as system 100 of FIG. 1. Process 400 may be used to determine an intelligent selection and suggested operations in response to the action, based on the location of the action and a simulated hyperlink model. Process 400 may begin by generating a simulated hyperlink model (405). The simulated hyperlink model may provide an intelligent selection and suggested operations, i.e., mobile applications with an intent, in response to a centered selection input. The intent can be one of any standard or nonstandard intents. FIG. 5 illustrates one example of building a simulated hyperlink model. Although not specifically illustrated in FIG. 4, the system may build the model on a server and push the model to a client device.

The system may receive an action (410), or in other words, a simulated hyperlink indication, at the client device. The action is associated with a location on the screen of the client device. The system may use the location and a screen capture image to extract content being displayed and generate a centered selection from the content (415). For example, the system may perform text and image recognition on the screen capture image to determine the text and text equivalents of images that are currently displayed. The system may then determine a word closest to the location of the action. The word closest to the location is the center word. The system may then pad the center word with other words appearing before and after the center word in the context. The words appearing before the center word are left context and the words appearing after the center word are right context. In some implementations, the system may avoid using words from other paragraphs or sections. Thus, for example, the system may not use words from a different paragraph or a different section in the left context or the right context. In such implementations, the system may pad the left context and right context, if needed, with one or more padding tokens. The padding tokens take the place of a word in the centered selection and enable the center word to remain in the center of the centered selection while excluding words from different paragraphs/sections/pages and still providing a centered selection with a predefined number of words. The predefined number of words may be any odd number and the number of words in the left context equals the number of words in the right context (with a padding token counting as a word).

The system may provide the centered selection to the simulated hyperlink model (420). The model may be machine-learning algorithm trained to predict an intelligent selection and one or more operations given the centered selection. In some implementations, the system provides the centered selection one character at a time to the model to reduce the vocabulary of the model.

In some implementations, the system may automatically initiate execution of the mobile application represented by an operation with a highest probability that also meets or exceeds a threshold (445). The system may initiate execution of the mobile application with an intent, using the intelligent selection as a parameter in the intent, as described in more detail below. In some implementations, the model may provide predicted or suggested operations for the centered selection, which the system may provide to the user (425). The system may provide the predicted or suggested operations when, for example, two or more operations have similar highest probabilities. Thus, the system may be unable to confidently decide the operation for the user. The system may also provide the predicted operation when the operation with the highest probability fails to meet a threshold. In some implementations, the system may add a copy operation or another default operation (e.g., search for the intelligent selection on the Internet) to the operations presented to the user as part of step 425. The system may provide a selectable control for each operation that enables a user to select the operation. The operations represent intents for mobile applications, such as search intents or share intents. The operations can also represent search intents for websites, for example when the client device is a laptop running a browser. In some implementations, the system may highlight the intelligent selection on the display (430). The intelligent selection is the portion of the centered link that will be used in the intent. The intelligent selection could be only the center word, or could be the center word plus one or two surrounding words. In an implementation that uses highlighting, for example, the user interface may include a way for the user to change the intelligent selection. For example, the user may expand or contract the words included in the intelligent selection.

The system waits for the user to select an operation control (435, Yes) or to end the operation suggestion interface (435, No). If the user does select a suggested operation (435, Yes), the system may generate a positive training example from the centered selection, intelligent selection, and the selected operation (440). This positive training example can be used to train the model, e.g., either by personalizing a copy of the model on the client device or by further training the original model at the server, e.g., by sending the positive example to the server, with user consent. This additional positive example may enable the model to automatically choose the selected operation in the future, rather than display the user interface that requires the user to select an operation. The system may then initiate execution of the mobile application represented by the operation with an intent, using the intelligent selection as a parameter in the intent (445). In some implementations, the intent is a standard intent, such as a search intent or share intent. Thus, the client device switches context from whatever application was currently executing, e.g., the source application, to the mobile application represented by the selected operation, e.g., the destination application. In an implementation where the client device is not a mobile device, the action may be associated with a search interface in a specific website that mirrors the mobile application, and the system may cause the browser to navigate to the search interface with a search intent using the intelligent selection as a parameter. Thus, the user is able to switch automatically to the destination application (e.g., the mobile application or the web mirror of the mobile application) using only the action received in step 410.

In some implementations, the operation may be associated with a mobile application that is not installed on the mobile device. When this occurs, the operation for the selected entity may be a secondary operation that, when selected, takes the user to an interface where the user can download and install the mobile application, or initiates installation of the mobile application automatically. Thus, it is understood that selection of the operation in step 435 may enable the user to install the mobile application. In some implementations, after the mobile application is successfully installed the system may automatically initiate an intent using the intelligent selection as a parameter to open the newly installed mobile application. In some implementations, if the user does not have a particular mobile application installed, the system may substitute a browser-based search of the intelligent selection. In some implementations, if no operation is specified the system may provide default options via a user interface, such as a browser search or a cut/copy option, for handling the intelligent selection.

FIG. 5 illustrates a flow diagram of an example process 500 for generating a simulated hyperlink model, in accordance with disclosed implementations. Process 500 may be performed by a simulated hyperlink system, such as system 100 of FIG. 1. Process 500 is an example of step 405 of FIG. 4 and may be used to build a simulated hyperlink model, such as model 130 or model 170 of FIG. 1. Process 500 may begin by obtaining a website to mobile application mapping (505). In some implementations, the mapping may be provided, e.g., curated by hand. In some implementations, the system may build the mapping. For example, the system may use mobile application manifests to determine a website mirror for a mobile application. In some implementations, the system may augment the mapping by clustering similar mobile applications together and mapping all similar applications to a website mirror. For example, there may be several reservation mobile applications, e.g., for booking a flight, rental car, hotel, etc. and these may be clustered together using conventional clustering algorithms. In some implementations, the system may map each application in a cluster to a website mirror. In some implementations, the system may use an emulator to determine which mobile applications a website maps to. For example, the emulator may be configured to obtain a query from search records and to simulate execution of various mobile applications (e.g., those available via a web store). The emulator may determine whether a particular mobile application returns results similar to those of the website given the same query. If so, the emulator may map the website to the mobile application. In some implementations, the emulator may be configured to provide a query to a mobile application and determine whether the mobile application ends up in a content state, or in other words returns valid search results for the query. If so, the system may find a website mirror, e.g., one that returns similar results given the same query. In any of these manners the system may build the website to mobile application mapping. In some implementations, the mapping may include mappings for non http and https URI schemes. For example, the "mailto:" URI may be mapped to an email application, the "tel:" URI may be mapped to a dialing application, a "geo:" URI may be mapped to a map application, etc.

The system may identify positive training examples for training the model (510). The positive training examples may be extracted from crawled documents, e.g., documents available over the Internet or an Intranet that include anchor tags. The crawled documents may be documents indexed by an Internet search engine. The system may select links in documents where the destination matches a whitelisted website or URI in the website to mobile application mapping. These links (i.e., the anchor tags and related information) are considered positive examples linking the anchor text to the mobile application(s) associated with the whitelisted website. The system may make a centered selection with the anchor text as the center portion, and the anchor text of the link being an example of an intelligent selection for the centered selection. Thus, the example may include, among other things, a centered selection extracted from the document, the anchor text, which represents an intelligent selection from the centered selection, and the mobile application. In some implementations, the system may also generate negative examples. For example, a mobile application that does not map to a website that is linked to by the anchor text may be a negative example.

The system may use the positive training examples and the negative ones to train the simulated hyperlink model (515). The system may provide the trained model to a client device (520). In some implementations, the model may be pushed to client devices when a simulated hyperlink application installed or the model is updated. In some implementations, the simulated hyperlink application may pull the model from the server, e.g., as part of an application update. At the client device, the system may determine whether to personalize the model (525). If no personalization is done (525, No), process 500 ends. Otherwise (525, Yes), the system may identify positive training examples from search records associated with the client device or with the user of the client device (530). For example, the system may use a screen capture index, a user profile or device profile to reweight training examples. The system may use the updated examples to further train the model (535). Thus, the model may be trained to predict actions most relevant to the user. Process 500 then ends.

FIG. 6 shows an example of a generic computer device 600, which may be operated as server 110, and/or client 150 of FIG. 1, which may be used with the techniques described here. Computing device 600 is intended to represent various example forms of computing devices, such as laptops, desktops, workstations, personal digital assistants, cellular telephones, smartphones, tablets, servers, and other computing devices, including wearable devices. The components shown here, their connections and relationships, and their functions, are meant to be examples only, and are not meant to limit implementations of the inventions described and/or claimed in this document.

Computing device 600 includes a processor 602, memory 604, a storage device 606, and expansion ports 610 connected via an interface 608. In some implementations, computing device 600 may include transceiver 646, communication interface 644, and a GPS (Global Positioning System) receiver module 648, among other components, connected via interface 608. Device 600 may communicate wirelessly through communication interface 644, which may include digital signal processing circuitry where necessary. Each of the components 602, 604, 606, 608, 610, 640, 644, 646, and 648 may be mounted on a common motherboard or in other manners as appropriate.

The processor 602 can process instructions for execution within the computing device 600, including instructions stored in the memory 604 or on the storage device 606 to display graphical information for a GUI on an external input/output device, such as display 616. Display 616 may be a monitor or a flat touchscreen display. In some implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk. In some implementations, the memory 604 may include expansion memory provided through an expansion interface.

The storage device 606 is capable of providing mass storage for the computing device 600. In one implementation, the storage device 606 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 604, the storage device 606, or memory on processor 602.

The interface 608 may be a high speed controller that manages bandwidth-intensive operations for the computing device 600 or a low speed controller that manages lower bandwidth-intensive operations, or a combination of such controllers. An external interface 640 may be provided so as to enable near area communication of device 600 with other devices. In some implementations, controller 608 may be coupled to storage device 606 and expansion port 614. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 630, or multiple times in a group of such servers. It may also be implemented as part of a rack server system. In addition, it may be implemented in a computing device, such as a laptop computer 632, personal computer 634, or tablet/smart phone 636. An entire system may be made up of multiple computing devices 600 communicating with each other. Other configurations are possible.

FIG. 7 shows an example of a generic computer device 700, which may be server 110 of FIG. 1, which may be used with the techniques described here. Computing device 700 is intended to represent various example forms of large-scale data processing devices, such as servers, blade servers, datacenters, mainframes, and other large-scale computing devices. Computing device 700 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 700 may include any number of computing devices 780. Computing devices 780 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 780a includes multiple racks 758a-758n. Each rack may include one or more processors, such as processors 752a-752n and 762a-762n. The processors may include data processors, network attached storage devices, and other computer controlled devices. In some implementations, one processor may operate as a master processor and control the scheduling and data distribution tasks. Processors may be interconnected through one or more rack switches 758, and one or more racks may be connected through switch 778. Switch 778 may handle communications between multiple connected computing devices 780.

Each rack may include memory, such as memory 754 and memory 764, and storage, such as 756 and 766. Storage 756 and 766 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 756 or 766 may be shared between multiple processors, multiple racks, or multiple computing devices and may include a computer-readable medium storing instructions executable by one or more of the processors. Memory 754 and 764 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 754 may also be shared between processors 752a-752n. Data structures, such as an index, may be stored, for example, across storage 756 and memory 754. Computing device 780 may include other components not shown, such as controllers, buses, input/output devices, communications modules, etc.

An entire system, such as system 100, may be made up of multiple computing devices 780 communicating with each other. For example, device 780a may communicate with devices 780b, 780c, and 780d, and these may collectively be known as system 100. As another example, system 100 of FIG. 1 may include one or more computing devices 780. Some of the computing devices may be located geographically close to each other, and others may be located geographically distant. The layout of system 700 is an example only and the system may take on other layouts or configurations.

According to certain aspects of the disclosure, a mobile device may include a display device, at least one processor, and memory storing instructions that, when executed by the at least one processor, cause the mobile device to perform operations including generating a centered selection responsive to detecting an action on content displayed on the display device, providing the centered selection to a simulated hyperlink model, the simulated hyperlink model being trained to predict an operation given a centered selection, the operation being associated with an intent for a mobile application, and initiating at least one of a) display of a user interface permitting selection of the operation, which uses the intent, or b) performance of the operation using the intent.

This and other aspects can include one or more of the following features. For example, the simulated hyperlink model may also be trained to provide an intelligent selection from the centered selection and initiating the operation occurs using the intelligent selection as a parameter for the intent. In some implementations, initiating display of the user interface can include displaying a menu with an icon for the mobile application and with an option to copy the intelligent selection. In some implementations, the operations may also include modifying the appearance of text displayed on the display that corresponds to the intelligent selection. As another example, the operations may also include initiating, responsive to receiving a selection of the operation from the user interface, performance of the operation using the intelligent selection. Such implementations may include generating a positive training example using the centered selection, the mobile application and/or up-weighting a weight for the positive training example. As another example, wherein initiating display of the user interface includes displaying an icon for the mobile application.

As another example, the centered selection may include a word nearest a location for the action and an equal quantity of words from the content that appears prior to the word nearest the location and following the word nearest the location. In some implementations, the words prior to and following the word nearest the location exclude words in different paragraphs and generating the centered selection include determining that the quantity of words prior to the word nearest the location is less than the equal quantity and adding padding tokens to the centered selection, the padding tokens being counted as words prior to the word nearest the location, so that the quantity of words prior to the word nearest the location s the equal quantity. As another example, the operations may also include receiving the simulated hyperlink model from a server, generating training examples from hyperlinks in a screen capture index for a user of the mobile device, and using the training examples to train the simulated hyperlink model, resulting in a personalized simulated hyperlink model.

According to certain aspects of the disclosure, a method includes identifying, from a document corpus, one or more documents having a hyperlink to a whitelisted website, the whitelisted website being one of a plurality of websites in a mapping of websites to mobile applications, generating positive training examples for a simulated hyperlink model using the one or more documents, each positive training example having a centered selection generated from the respective document, a website, a weight corresponding to a page rank of the website, and a mobile application mapped to the website, and training the simulated hyperlink model, using the positive training examples, to predict an operation for the mobile application given the centered selection.

This and other aspects can include one or more of the following features. For example, the method may also include identifying a website in a manifest of a first mobile application; and adding the website and the first mobile application to the mapping. In some implementations, the manifest specifies an intent and the operation for the mobile application is the intent. As another example, the mobile application may be a first mobile application and the method also includes clustering similar mobile applications in a web store, the first mobile application appearing in a first cluster, identifying a document with a hyperlink to the website, determining an intelligent selection based on the hyperlink, verifying that a result generated by the first mobile application for the intelligent selection is similar to a result generated by a second mobile application for the intelligent selection, the second mobile application being in the first cluster, and adding, responsive to the verifying, the website and the second mobile application to the mapping.

As another example, the method may also include personalizing the model based on a screen capture index for a user of a mobile device. As another example, the mapping may include records mapping a non-http uniform resource indicator (URI) to a mobile application and the one ore more documents include a hyperlink using the non-http URI. As another example, the centered selection includes anchor text for the hyperlink and the model is further trained to predict the anchor text as an intelligent selection.

According to certain aspects of the disclosure, a method includes generating, responsive to detecting a simulated hyperlink indication, a centered selection from content displayed on a display of a mobile computing device, providing the centered selection to a simulated hyperlink model, the simulated hyperlink model being trained to predict an operation given the centered selection, the operation being associated with an intent for a mobile application, and initiating the operation using the intent.

This and other aspects can include one or more of the following features. For example, generating the centered selection can include performing text and image recognition on a screen capture of the content to determine words represented in the content and determining a word closest to a location of the simulated hyperlink model as a center word in the centered selection. As another example, generating the centered selection can also include using padding tokens in place of words in the centered selection to avoid including words from different sections. As another example, the simulated hyperlink model may also trained to make an intelligent selection from the centered selection, the intelligent selection representing a portion of the centered selection and using the intelligent selection as a parameter for the intent. As another example, the operation may be a first operation and the method also includes receiving the first operation and a second operation from the simulated hyperlink model, determining a probability score for the first operation and a probability score for the second operation are similar, providing a user interface that enables a user of the mobile computing device to select the first operation or the second operation, receiving a selection of the first operation, generating a positive training example from the centered selection and the first operation, and initiating the first operation using the intent. As another example, the method may also include obtaining, responsive to detecting the simulated hyperlink indication, a partial screen capture image, wherein the centered selection is obtained from the partial screen capture image.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A mobile device comprising:
   a display device;
   at least one processor;
   a simulated hyperlink model, the simulated hyperlink model being a neural-network trained to predict at least one operation when provided a preselected quantity of words as input, the operation being associated with an intent for a mobile application; and
   memory storing instructions that, when executed by the at least one processor, cause the mobile device to:
      detect an action on content displayed on the display device, the action having a location,
      generate a centered selection responsive to detecting the action, the centered selection including a word nearest the location for the action and an equal quantity of words from the content appearing prior to the word nearest the location and following the word nearest the location so that the centered selection has the preselected quantity of words,
      provide the centered selection to the simulated hyperlink model,
      obtain a predicted operation from the simulated hyperlink model, and
      initiate at least one of:
         a) display of a user interface permitting selection of the operation, which uses the intent, or
         b) performance of the operation using the intent.

2. The mobile device of claim 1, wherein the simulated hyperlink model is further trained to provide a sub-selection from the centered selection and performance of the operation occurs using the sub-selection as a parameter for the intent.

3. The mobile device of claim 2, wherein initiating display of the user interface includes displaying a menu with an icon for the mobile application and with an option to copy the sub-selection.

4. The mobile device of claim 2, wherein the memory further stores instructions that, when executed by the at least one processor, cause the mobile device to:
   modify the appearance of text displayed on the display that corresponds to the sub-selection.

5. The mobile device of claim 1, wherein the memory further stores instructions that, when executed by the at least one processor, cause the mobile device to:
   obtain a sub-selection of the centered selection from the simulated hyperlink model; and
   initiate, responsive to receiving a selection of the operation from the user interface, performance of the operation using the sub-selection.

6. The mobile device of claim 1, wherein initiating display of the user interface includes displaying an icon for the mobile application.

7. The mobile device of claim 1, wherein the action is a drag and release of an icon at the location and an equal quantity of words from the content appearing prior to the word nearest the location and following the word nearest the location.

8. The mobile device of claim 1, wherein the words prior to and following the word nearest the location exclude words in different paragraphs and generating the centered selection includes:
   determining that the quantity of words prior to the word nearest the location is less than the equal quantity; and
   adding padding tokens to the centered selection, the padding tokens being counted as words prior to the word nearest the location, so that the quantity of words prior to the word nearest the location is the equal quantity.

9. The mobile device of claim 1, wherein the memory further stores instructions that, when executed by the at least one processor, cause the mobile device to:
   receive the simulated hyperlink model from a server;
   generate training examples from hyperlinks in a screen capture index for a user of the mobile device; and
   use the training examples to train the simulated hyperlink model, resulting in a personalized simulated hyperlink model.

10. A method performed on a mobile device, the method comprising:
    generating, responsive to detecting a simulated hyperlink indication, a centered selection from content displayed on a display of a mobile computing device, the centered selection including a word nearest a location for the simulated hyperlink indication and an equal quantity of words from the content appearing prior to the word nearest the location and following the word nearest the location so that the centered selection has a preselected quantity of words;
    providing the centered selection to a simulated hyperlink model, the simulated hyperlink model being a neural-network trained to predict an operation given an input with the preselected quantity of words, the operation being associated with an intent for a mobile application, the simulated hyperlink model being stored on the mobile device;
    obtaining a predicted operation from the simulated hyperlink model for the centered selection; and
    initiating at least one of:
       a) display of a user interface permitting selection of the operation, which uses the intent, or
       b) performance of the operation using the intent.

11. The method of claim 10, wherein generating the centered selection includes:
    performing text and image recognition on a screen capture of the content to determine words represented in the content; and
    determining a word closest to a location of the simulated hyperlink indication as a center word in the centered selection.

12. The method of claim 10, wherein generating the centered selection further includes:

using padding tokens in place of words in the centered selection to avoid including words from different sections.

13. The method of claim 10, wherein the simulated hyperlink model is also trained to make a sub-selection from the centered selection, the sub-selection representing a portion of the centered selection and using the sub-selection as a parameter for the intent.

14. The method of claim 10, wherein the operation is a first operation and the method further comprises:
obtaining a second operation and the first operation from the simulated hyperlink model;
determining a probability score for the first operation and a probability score for the second operation are similar;
providing the user interface, which enables the user of the mobile computing device to select the first operation or the second operation;
receiving a selection of the first operation;
generating a positive training example from the centered selection and the first operation; and
initiating the first operation using the intent.

15. The method of claim 10, further comprising:
obtaining, responsive to detecting the simulated hyperlink indication, a partial screen capture image,
wherein the centered selection is obtained from the screen capture image.

* * * * *